(12) United States Patent
Barnes et al.

(10) Patent No.: US 11,415,766 B2
(45) Date of Patent: Aug. 16, 2022

(54) HIGH DENSITY OPTICAL FIBER DISTRIBUTION SUB-RACK

(71) Applicant: Prysmian S.p.A., Milan (IT)

(72) Inventors: Andrew Barnes, Milan (IT); John Shuman, Milan (IT)

(73) Assignee: PRYSMIAN S P A., Milan (IT)

(*) Notice: Subject to any disclaimer, the term of this patent is extended or adjusted under 35 U.S.C. 154(b) by 87 days.

(21) Appl. No.: 16/977,416

(22) PCT Filed: Mar. 8, 2018

(86) PCT No.: PCT/IB2018/051520
§ 371 (c)(1),
(2) Date: Sep. 1, 2020

(87) PCT Pub. No.: WO2019/171149
PCT Pub. Date: Sep. 12, 2019

(65) Prior Publication Data
US 2021/0048592 A1    Feb. 18, 2021

(51) Int. Cl.
*G02B 6/00* (2006.01)
*G02B 6/44* (2006.01)
(Continued)

(52) U.S. Cl.
CPC ......... *G02B 6/4452* (2013.01); *G02B 6/3825* (2013.01); *G02B 6/3897* (2013.01); *G02B 6/4453* (2013.01); *H04Q 1/064* (2013.01)

(58) Field of Classification Search
CPC .. G02B 6/4452; G02B 6/3825; G02B 6/3897; G02B 6/4453; G02B 6/00; H04Q 1/064; H04Q 1/131
See application file for complete search history.

(56) References Cited

U.S. PATENT DOCUMENTS 5,946,440 A    8/1999 Puetz
6,385,381 B1*  5/2002 Janus ................... G02B 6/4441
                                                385/135
(Continued)

FOREIGN PATENT DOCUMENTS

EP    2551709 A1    1/2013
WO    2015189384 A1    12/2015

OTHER PUBLICATIONS

Prysmian Group, "SRS4000 Distribution Sub-Rack," RM038, Issue 03, Nov. 1, 2017, 14 pages.

*Primary Examiner* — Jennifer Doan
(74) *Attorney, Agent, or Firm* — Slater Matsil, LLP

(57) ABSTRACT

High density optical fiber distribution sub-rack comprising: a chassis for housing a plurality of shelves, the chassis comprising at least two shelf storage areas placed side by side with each other, at least one shelf housed in one of the at least two storage areas of the chassis, the at least one shelf having an internal hollow seat for connection modules, the at least one shelf comprising one or more connection modules having a plurality of adapters for interconnection optical fibers, the connection modules being arranged in the internal hollow seat of the at least one shelf at the frontal face of the at least one shelf, wherein the at least one shelf is guided so as to be movable towards the external of the chassis by the succession of a translation movement and a rotation movement of the at least one shelf.

20 Claims, 4 Drawing Sheets

(51) Int. Cl.
    *G02B 6/38*     (2006.01)
    *H04Q 1/06*     (2006.01)

(56) References Cited

U.S. PATENT DOCUMENTS

| | | | |
|---|---|---|---|
| 7,391,925 | B2 | 6/2008 | Chen et al. |
| 9,584,879 | B2 * | 2/2017 | Takeuchi ................ H04Q 1/06 |
| 10,627,591 | B2 * | 4/2020 | Geling ................ G02B 6/4452 |
| 10,718,920 | B2 * | 7/2020 | Ellison ................ G02B 6/4459 |
| 2016/0047999 | A1 | 2/2016 | Alexi et al. |

\* cited by examiner

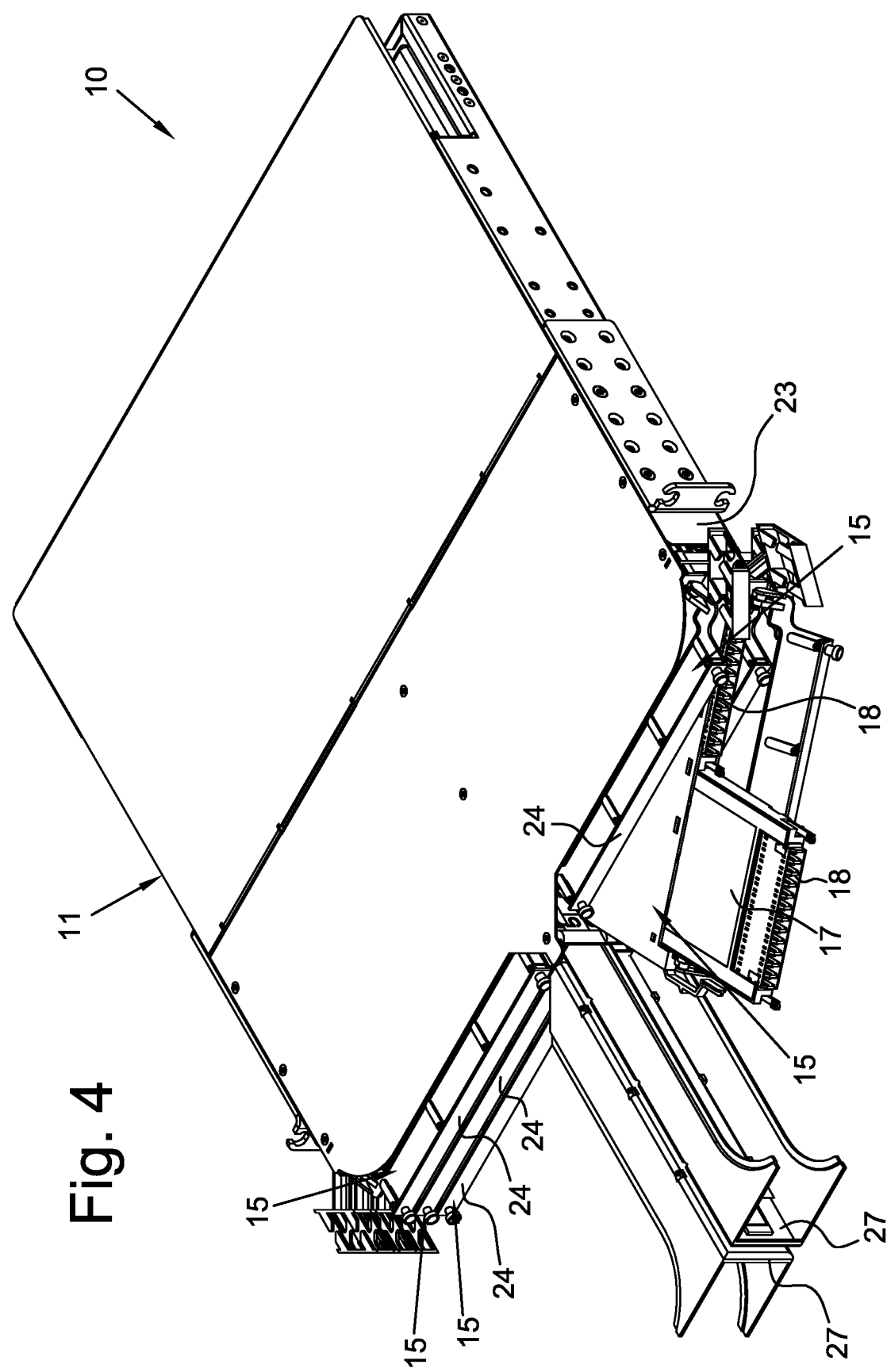

HIGH DENSITY OPTICAL FIBER DISTRIBUTION SUB-RACK

CROSS-REFERENCE TO RELATED APPLICATIONS

This application is a national stage of International Application No. PCT/IB2018/051520, filed on Mar. 8, 2018, which application is hereby incorporated herein by reference in its entirety.

TECHNICAL FIELD

The present application relates to optical fiber distribution, and in particular to high density optical fiber distribution sub-rack.

BACKGROUND

The present invention refers to a high density optical fiber distribution sub-rack particularly useful in the telecommunication field.

As known, the optical fiber network currently used in the telecommunication provide a plurality of connection nodes where optical fibers of different network branches are connected to each other. These nodes are generally installed in data centers that typically house a plurality of racks that contains a plurality of network devices, as for example servers, routers and so on. These racks, moreover, house one or more distribution sub-racks that present a plurality of connection modules. The connection modules are provided with one or more optical fiber adapters or connectors, such as the LC or SC connectors, to which interconnection optical fibers or jumpercords are connected.

Typically, the optical fiber adapters or connectors are very close to each other in order to maximize the number of the optical fibers that can be connected to the sub-rack. This involves a high density of jumpercords connected to the sub-rack that makes the installation, maintenance and replacement of the jumpercord operations very difficult.

Sub-racks are known that have a frame in which the connection modules are directly arranged with the connectors in a fixed position; an example of such sub-racks is the LigthStack Ultra High Density Enclosure of Siemon as described in the specification sheet of Jun. 15, 2017.

Furthermore, sub-racks are known that present a frame which contains a shelf that houses the connection modules; in particular, the shelf is arranged to rotate towards the external of the sub-rack so as to facilitate the operations on the jumpercords; an example of such sub-racks is the SRS4000 Distribution Sub-Rack of Prysmian Group as described in the datasheet of Nov. 3, 2017.

U.S. Pat. No. 7,391,925 describes a network interconnection apparatus including: a housing defining at least one opening for mounting at least one connector or adapter therein; a cable storage tray movably attached to the housing so as to be movable between an opened position and a closed position for cable access, and a predetermined length of pre-connectorized fiber optic cable maintained on the storage tray, wherein a first end of the fiber optic cable terminates in at least one connector routed to the at least one connector or adapter within the apparatus and a second end of the fiber optic cable terminates in at least one connector that is routed to a predetermined location within a fiber optic network.

U.S. Pat. No. 7,391,925, then, describes a data center network apparatus for linking separated fiber optic connection points using a length of pre-connectorized fiber optic cable.

The cable storage tray of the described apparatus is capable of rotating when fully extended out of the housing by means of a sliding motion permitted by a guide slot in the housing.

EP 2 551 709 describes an optical fiber distribution device, including an outer box and an inner frame, said inner frame being movable inside said box. The main feature of the described device, is that the device involves connecting means between said frame and said box, so that the inner frame can be rotated in two opposite directions, or it can be linearly slid out from the box.

SUMMARY

In various embodiments, a high density optical fiber distribution sub-rack comprises a chassis for housing a plurality of shelves, said chassis comprising at least two shelf storage areas placed side by side with each other, at least one shelf housed in one of the at least two storage areas of the chassis, said at least one shelf having an internal hollow seat for connection modules, said at least one shelf comprising one or more connection modules having a plurality of adapters for interconnection optical fibers, said connection modules being arranged in the internal hollow seat of the at least one shelf at the frontal face of the at least one shelf, wherein the at least one shelf is guided so as to be movable towards the external of the chassis (i.e. movable at least partly out of the chassis) by the succession of a translation movement and a rotation movement of the at least one shelf.

In fact, the sub-rack according to the present invention, allows to mount a high number of adapters, thanks to the presence of two or more shelf storage areas each one of which are capable of containing a plurality of module connections housed in a shelf, assuring at the same time an easy access to the frontal adapters thanks to the capacity of partially extracting each shelf from the chassis.

The rotation of each shelf is allowed just after the translation movement. This reduces the slack required in the jumpercords with respect to the prior art.

Preferably, the rotation movement occurs around an axis orthogonal to the bottom wall of the chassis.

In this way, by extracting a shelf from the chassis it is possible to easy work on different shelves at the same time and more space is available for inserting or extracting connectors from the adapters.

Preferably, the at least one shelf is guided by a guided pin that cooperates with a guiding slot, the guiding pin being fixed to the chassis inside the shelf storage areas where the at least one shelf is housed and the guiding slot being made in the at least one shelf.

In this way, the guiding of the shelves is achieved through a very simple mechanism that also assures that the chassis and the shelves can be easily produced.

In a preferred embodiment, each one of the shelf storage areas houses at least one of said shelves, the guiding pins and the guiding slots of the shelves are arranged so that the rotation of two shelves housed in adjacent shelf storage areas occur in two opposite directions.

In this way, jumpercords may be routed from the adaptors to both sides of the sub-rack.

Preferably, at least one of the shelf storage areas comprises a plurality of shelves superimposed one on top of the other so that the guiding slots are aligned.

In this way, it is possible to densely populate a shelf storage area with a large number of adapters assuring the capability of modular accessing to the adapters.

In a preferred embodiment the guiding pins present a double D cross sectional shape and the guiding slots present straight sides, circular ends and curved ends.

Preferably, the connection modules are arranged in each shelf in a single array or in two stacked arrays placed side by side with each other.

In this way the modularity of the sub-rack increases.

Preferably, at least one shelf is made in a single moulded plastic piece.

BRIEF DESCRIPTION OF THE DRAWINGS

Further characteristics will be apparent from the detailed description given hereinafter with reference to the accompanying drawings, in which:

FIG. 4 is a schematic perspective view of the sub-rack of FIG. 1 with one of the shelves in an open position and a connection module extracted from the shelf.

DETAILED DESCRIPTION OF ILLUSTRATIVE EMBODIMENTS

Figure 1:
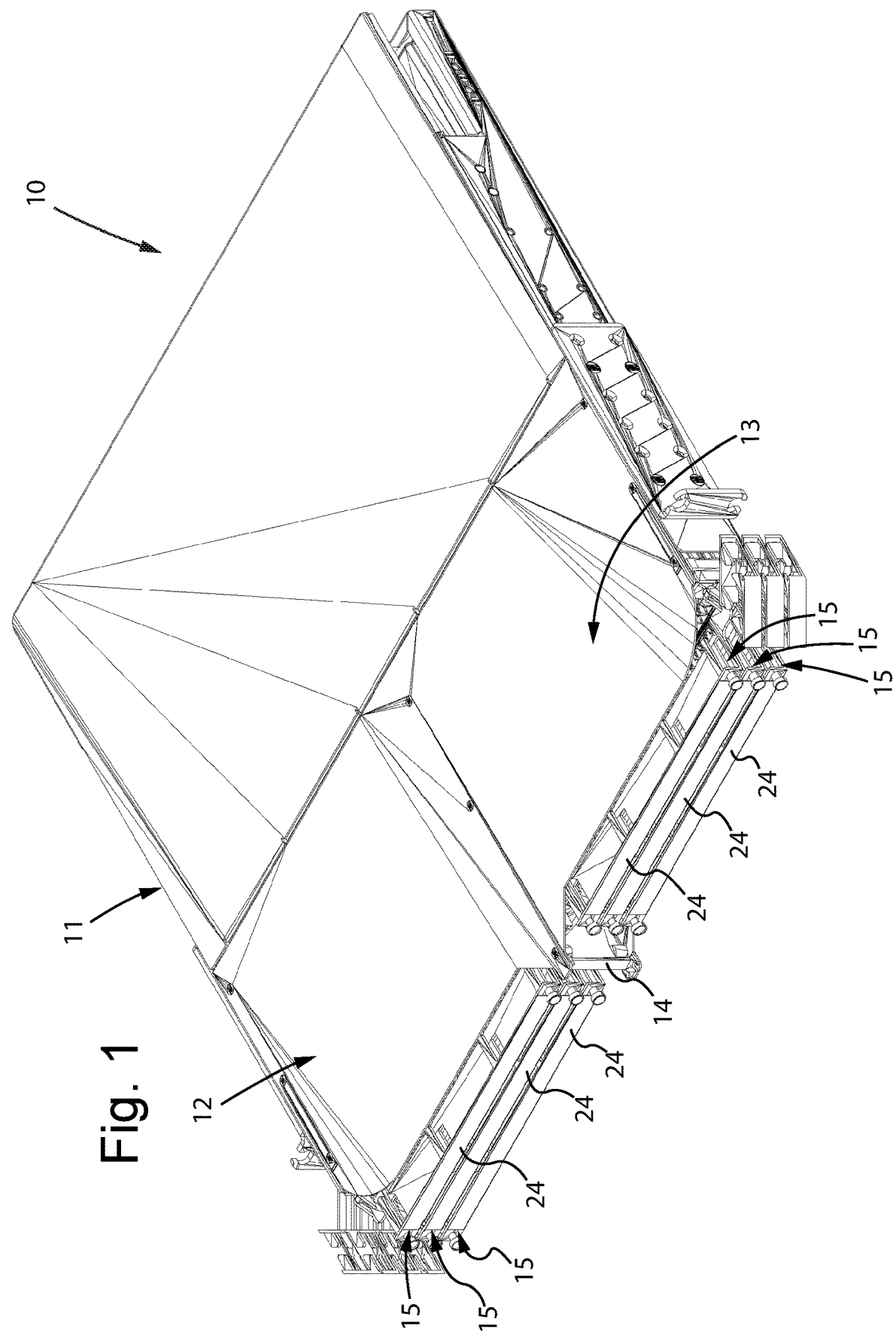
FIG. 1 is a schematic perspective view of a high density optical fiber distribution sub-rack according to the present invention.
Figure 2:
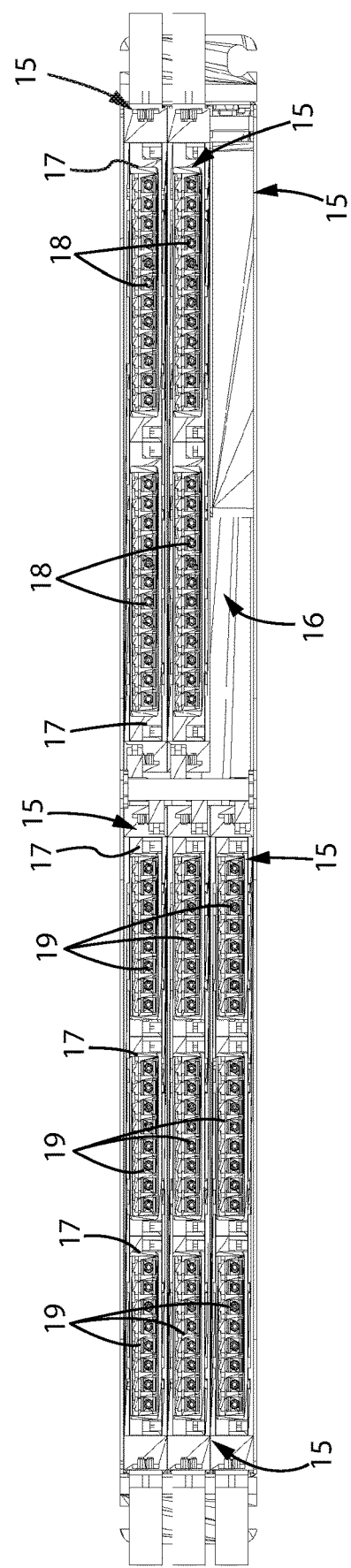
FIG. 2 is a schematic frontal view of the sub-rack of FIG. 1.

In light of the above state of the art, the Applicant has faced the problem of increasing the accessibility of the connection modules for the removal or insertion of jumpercords and of improving the cable management in high density optical fiber distribution sub-racks, such that cables and jumpercords may be used with minimal slack. The high density optical fiber distribution sub-rack as described in various embodiments in this application has many advantages that overcome these and other problems.

A high density optical fiber distribution sub-rack 10 according to the present invention is shown in the enclosed figures.

For example, the high density optical fiber distribution sub-rack 10 can be adapted for being inserted in a 1 Rack Unit (1U) or in a 2 Rack Unit (2U) or in a 4 Rack Unit (4U) and so on for 19" or 23" racks.

The high density optical fiber distribution sub-rack 10 comprises a chassis 11, preferably made of metal, that comprises at least two shelf storage areas 12, 13 placed side by side with each other. The shelf storage areas 12, 13 can be separated one from one another by means of one or more divider wall elements 14.

In the illustrated embodiment, the chassis 11 comprises a left shelf storage area 12 and a right shelf storage area 13 separated one from one another by a divider wall element 14.

For the sake of clarity, it is specified that in the present description, the terms "left", "right", "top", "bottom", "side" "front", "rear" refer to the positions assumed by an element during the work condition, i.e. after the installation of the high density optical fiber distribution sub-rack 10.

At least one shelf 15 is housed in one of the at least two storage areas 12, 13 of the chassis 11, said at least one shelf having an internal hollow seat 16 for connection modules 17.

The at least one shelf 15, in particular, is made in a single moulded plastic piece.

The at least one shelf 15, moreover, presents a clip coupling arm (not illustrated) for coupling to the chassis 11.

The at least one shelf 15 comprises one or more connection modules 17 having a plurality of adapters 18, 19 for interconnection optical fibers. The connection modules 17, in particular, are arranged in the internal hollow seat 16 of the at least one shelf 15 at the frontal face of the at least one shelf 15.

Preferably, the connection modules 17 are arranged in a single array or in two stacked arrays placed side by side with each other.

In the illustrated embodiment, the shelf storage areas 12, 13 comprises a plurality of shelves superimposed one on top of the other; the connection modules 17 are arranged in a triple array in the shelves 15 housed in the left shelf storage area 12, whereas the connection modules 17 are arranged in a dual array in the shelves 15 of the right shelf storage area 13.

The connection modules 17 are adapted to house adapter blocks 18, 19 of the LC or SC type. For example, in the illustrated embodiment the connection modules 17 mounted in the left shelf storage area 12 house 8-adapter blocks 18 whereas the connection modules 17 mounted in the right shelf storage area 13 house 12-adapter blocks 19.

For example, the sub-rack 10 according to the illustrated embodiment is capable of housing 144 adapters.

According to the present invention, the at least one shelf 15 is guided so as to be movable towards the external of the chassis 11 by the succession of a translation and a rotation movement.

In particular, as visible in FIG. 4, the rotation movement can occur around an axis orthogonal to the plane.

In the illustrated embodiment the at least one shelf 15 is guided by a guided pin 21 that cooperates with a guiding slot 22 wherein the guiding pin 21 is fixed to the chassis 11 inside the shelf storage areas 12, 13 where the at least one shelf 15 is housed and the guiding slot 22 is made in the at least one shelf 15.

In particular, the guiding pin 21 and the guiding slot 22 are shaped so that the at least one shelf 15 can be firstly slid out of the subrack 10 up to an end position; once reached this end position, the shelf 15 can be rotated towards the external allowing an easy access to the connection modules 17 and the adapter blocks 18, 19 housed therein.

In the illustrated embodiment each one of the shelf storage areas 12, 13 houses a plurality of said shelves 15 superimposed one on top of the other. In this case, the shelves are arranged so that their guiding slots 22 are aligned.

In this case, the guiding pins 21 of each shelf storage area 12, 13 is long enough to pass through all the aligned superimposed guiding slots 22; in this way, each shelf 15 of the stack of shelves may be moved independently from the others through the sliding of the common pin 21 in its guiding slot 22.

Moreover, the guiding pins 21 and the guiding slots 22 are arranged so that the rotation of two shelves 15 housed in adjacent shelf storage areas 12, 13 occur in two opposite directions.

In the illustrated embodiment, the guiding pins are fixed inside the shelf storage areas 12, 13 close to the lateral walls 23 of the chassis 11. The guiding pins, in particular, can be fixed to the bottom walls and/or to the top walls of the shelf storage areas 12, 13.

Advantageously, each one of the guiding pins 21 presents a double D cross sectional shape and each one of the guiding slots 22 presents straight sides, a circular end 25 and a curved end 26. The two ends 25, 26 of the guiding slots 22 are distal 25 and proximal 26 with respect to the frontal face of the respective shelves 15.

Figure 3A:
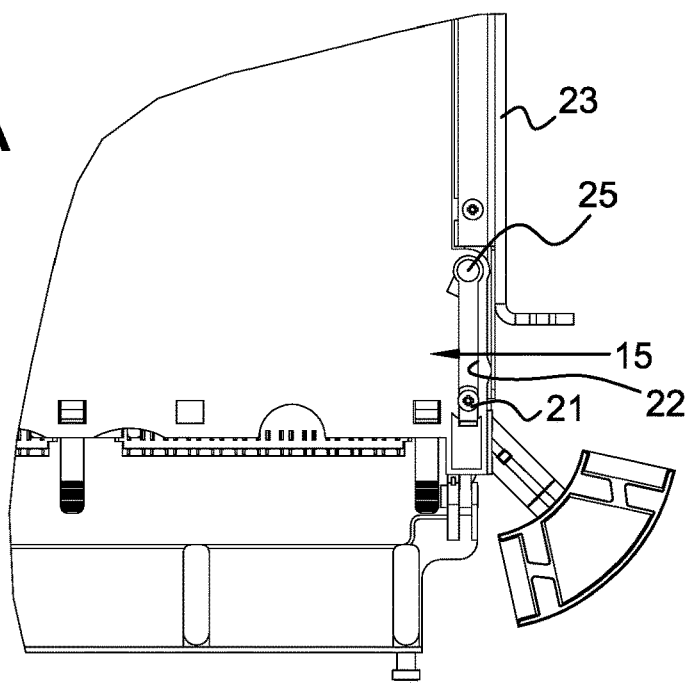
FIGS. 3A and 3B are two detail view of one shelf in a closed position and in an open position respectively.
Figure 3B:
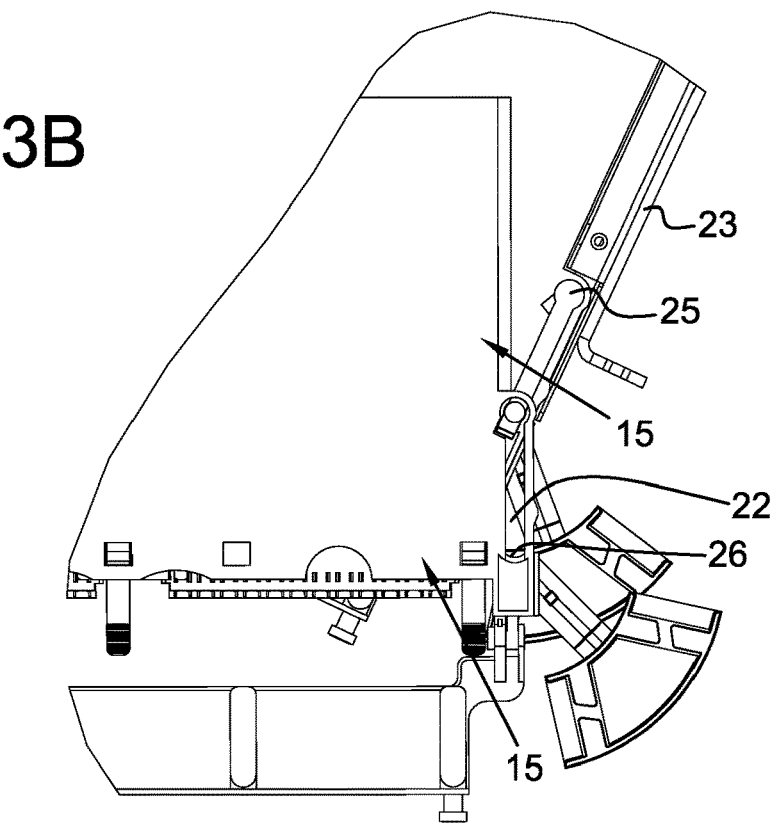

In order to explain the guiding motion of the shelves 15 let us consider the embodiment illustrated in FIGS. 3A and 3B in which a plurality of shelves 15 are housed in a respective shelf storage area 12, 13. When the shelves 15 are inserted in the shelf storage areas 12, 13, as in FIG. 3A, the guiding pin 21 is in the proximal curved end 26 of the guiding slots 22 of all the shelves 15 and the shelves 15 cannot rotate because of the abutment with the lateral walls 23 of the chassis 11 and the divider wall element 14. When one of the shelves 15 is slid out, the distal circular end 25 of the guiding slot 22 reaches the guiding pin 21; in this position a partial rotation of the shelf 15 is allowed.

The sub-rack can be provided also with a plurality of cover trays 24 attachable to the shelves at their frontal face in order to protect the connected jumpercords and to act as a label carrier.

The sub rack may be further provided with two doors 27 for closing the shelf storage areas 12, 13.

The invention claimed is:

1. A high density optical fiber distribution sub-rack comprising:
a chassis for housing a plurality of shelves, the chassis comprising at least two shelf storage areas placed side by side with each other; and
at least one shelf housed in one of the at least two storage areas of the chassis, the at least one shelf having an internal hollow seat for connection modules, the at least one shelf comprising one or more connection modules having a plurality of adapters for interconnection optical fibers, the connection modules being arranged in the internal hollow seat of the at least one shelf at the frontal face of the at least one shelf, wherein the at least one shelf is guided so as to be movable towards the external of the chassis by the succession of a translation movement and a rotation movement of the at least one shelf, wherein the at least one shelf is guided by a guided pin that cooperates with a guiding slot, the guiding pin being fixed to the chassis inside the shelf storage areas, wherein the at least one shelf is housed and the guiding slot being made in the at least one shelf.

2. The high density optical fiber distribution sub-rack according to claim 1, wherein the rotation movement occurs around an axis orthogonal to a bottom wall of the chassis.

3. The high density optical fiber distribution sub-rack according to claim 1, wherein each one of the shelf storage areas houses at least one of the shelves, the guiding pins and the guiding slots of the shelves are arranged so that the rotation of two shelves housed in adjacent shelf storage areas occur in two opposite directions.

4. The high density optical fiber distribution sub-rack according to claim 1, wherein at least one of the shelf storage areas comprises a plurality of shelves superimposed one on top of the other so that the guiding slots are aligned.

5. The high density optical fiber distribution sub-rack according to claim 1, wherein the guiding pins present a double D cross sectional shape and the guiding slots present straight sides, circular ends and curved ends.

6. The high density optical fiber distribution sub-rack according to claim 1, wherein the connection modules are arranged in a single array or in two stacked arrays placed side by side with each other.

7. The high density optical fiber distribution sub-rack according to claim 1, wherein the at least one shelf is made in a single molded plastic piece.

8. A high density optical fiber distribution sub-rack comprising:
a chassis for housing a plurality of shelves, the chassis comprising a first shelf storage area and a second shelf storage area placed side by side with each other;
a first shelf housed in the first shelf storage area, the first shelf having a first internal hollow seat for first connection modules, each of the first connection modules having a plurality of first adapters for interconnection optical fibers, the first connection modules being arranged in the first internal hollow seat of the first shelf at a face of the first shelf, wherein the first shelf is guided so as to be movable towards the external of the chassis by the succession of a translation movement and a rotation movement of the first shelf; and
a second shelf housed in the second shelf storage area, the second shelf having a second internal hollow seat for second connection modules, each of the second connection modules having a plurality of second adapters for interconnection optical fibers, the second connection modules being arranged in the second internal hollow seat of the second shelf at a face of the second shelf, wherein the second shelf is guided so as to be movable towards the external of the chassis by the succession of a translation movement and a rotation movement of the second shelf, wherein the first shelf is guided by a first guided pin that cooperates with a first guiding slot, the first guiding pin being fixed to the chassis inside the first shelf storage area, wherein the first shelf is housed and the first guiding slot being made in the first shelf, and wherein the second shelf is guided by a second guided pin that cooperates with a second guiding slot, the second guiding pin being fixed to the chassis inside the second shelf storage area, wherein the second shelf is housed and the second guiding slot being made in the second shelf.

9. The high density optical fiber distribution sub-rack according to claim 8, wherein the rotation movement occurs around an axis orthogonal to a bottom wall of the chassis.

10. The high density optical fiber distribution sub-rack according to second guiding pins and the second guiding slots of the second shelf are arranged so that the rotation of the first shelf occurs in a direction opposite to the rotation of the second shelf.

11. The high density optical fiber distribution sub-rack according to claim 8, wherein the first shelf storage area further comprises a plurality of first shelves disposed over the first shelf and superimposed one on top of each other so that the first guiding slots are aligned and wherein the second shelf storage area further comprises a plurality of second shelves disposed over the second shelf and superimposed one on top of each other so that the second guiding slots are aligned.

12. The high density optical fiber distribution sub-rack according to claim 8, wherein the first guiding pins have a double D cross sectional shape and the first guiding slots have straight sides, circular ends and curved ends, and wherein the second guiding pins have a double D cross sectional shape and the second guiding slots have straight sides, circular ends and curved ends.

13. The high density optical fiber distribution sub-rack according to claim 8, wherein the first connection modules and the second connection modules are arranged in a single array.

14. The high density optical fiber distribution sub-rack according to claim 8, wherein the first connection modules and the second connection modules are each arranged in two stacked arrays placed side by side with each other.

15. The high density optical fiber distribution sub-rack according to claim 8, wherein the first shelf is made in a first single molded plastic piece, and wherein the second shelf is made in a second single molded plastic piece separate from the first single molded plastic piece.

16. An optical fiber distribution sub-rack comprising:
a chassis comprising shelf storage areas placed side by side with each other; and
at least one shelf housed in one of the storage areas of the chassis, the at least one shelf having an internal hollow seat, the at least one shelf comprising one or more connection modules having a plurality of adapters for interconnection optical fibers, the one or more connection modules being arranged in the internal hollow seat of the at least one shelf at the frontal face of the at least one shelf, wherein the at least one shelf is guided so as to be movable towards the external of the chassis by the succession of a translation movement and a rotation movement of the at least one shelf, wherein the rotation movement occurs around an axis orthogonal to a bottom wall of the chassis, wherein the at least one shelf is guided by a guided pin that cooperates with a guiding slot, the guiding pin being fixed to the chassis inside the shelf storage areas, wherein the at least one shelf is housed and the guiding slot being made in the at least one shelf.

17. The optical fiber distribution sub-rack according to claim 16, wherein the connection modules are arranged in a single array or in two stacked arrays placed side by side with each other.

18. The optical fiber distribution sub-rack according to claim 16, wherein the at least one shelf is made in a single molded plastic piece.

19. The optical fiber distribution sub-rack according to claim 16, wherein each one of the shelf storage areas houses at least one shelf, the guiding pins and the guiding slots of the at least one shelf are arranged so that the rotation of two shelves housed in adjacent shelf storage areas occur in two opposite directions.

20. The optical fiber distribution sub-rack according to claim 16, wherein at least one of the shelf storage areas comprises a plurality of shelves superimposed one on top of the other so that the guiding slots are aligned.

* * * * *

UNITED STATES PATENT AND TRADEMARK OFFICE
CERTIFICATE OF CORRECTION

PATENT NO. : 11,415,766 B2  
APPLICATION NO. : 16/977416  
DATED : August 16, 2022  
INVENTOR(S) : Barnes et al.

Page 1 of 1

It is certified that error appears in the above-identified patent and that said Letters Patent is hereby corrected as shown below:

On the Title Page

Item (73) Assignee; delete "PRYSMIAN S P A." and insert --PRYSMIAN S.P.A.--.

In the Claims

Claim 10, Column 6, Line 48; insert --claim 8, wherein the first guiding pins and the first guiding slots of the first shelf and the-- between "to" and "second".

Signed and Sealed this  
Twenty-seventh Day of September, 2022

Katherine Kelly Vidal  
*Director of the United States Patent and Trademark Office*